United States Patent
Willmot et al.

(10) Patent No.: US 11,371,557 B2
(45) Date of Patent: Jun. 28, 2022

(54) TANK SUPPORT ASSEMBLY FOR A VEHICLE

(71) Applicant: THE BOEING COMPANY, Chicago, IL (US)

(72) Inventors: Ryan Fraser Willmot, Huntsville, AL (US); Jeffery Scott Anderson, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 865 days.

(21) Appl. No.: 15/971,121

(22) Filed: May 4, 2018

(65) Prior Publication Data

US 2019/0338807 A1 Nov. 7, 2019

(51) Int. Cl.
*F16C 32/04* (2006.01)
*B64G 1/40* (2006.01)
(Continued)

(52) U.S. Cl.
CPC .......... *F16C 32/0425* (2013.01); *B64G 1/402* (2013.01); *B64G 1/50* (2013.01);
(Continued)

(58) Field of Classification Search
CPC .. B64G 1/402; F16C 2326/47; F16C 32/0425; F16L 59/06; F17C 2201/0104; F17C 2201/0133; F17C 2201/0157; F17C 2203/017; F17C 2203/0391; F17C 2221/08; F17C 2260/033; F17C 2270/0189; F17C 2270/0194; F17C 2270/0197; F17C 3/08; H01F 7/02; H01F 7/0268; Y02E 60/32
(Continued)

(56) References Cited

U.S. PATENT DOCUMENTS 5,334,965 A 8/1994 Dolgin
6,162,364 A 12/2000 Tillotson et al.
(Continued)

FOREIGN PATENT DOCUMENTS

EP 0138120 A2 9/1984
GB 2025029 A 6/1979
(Continued)

OTHER PUBLICATIONS

Qian et al. "Novel Magnetic Spring and Magnetic Bearing" IEEE Transactions on Magnetics vol. 39, No. 1; 2003 (4 pages).
(Continued)

*Primary Examiner* — Nicholas McFall
*Assistant Examiner* — Marisa V Conlon
(74) *Attorney, Agent, or Firm* — The Small Patent Law Group LLC; Philip S. Hof

(57) ABSTRACT

A tank support assembly for a vehicle includes a vehicle structure and a storage tank assembly. The storage tank assembly is held in place relative to the vehicle structure via a magnetic support system. The magnetic support system includes tank magnets affixed to the storage tank assembly and structure magnets affixed to the vehicle structure. The tank magnets interact with the structure magnets to passively provide repulsive magnetic forces that constrain movement of the storage tank assembly relative to the vehicle structure without the tank magnets mechanically engaging the structure magnets.

20 Claims, 8 Drawing Sheets

(51) Int. Cl.
*B64G 1/50* (2006.01)
*F16L 59/06* (2006.01)
*H01F 7/02* (2006.01)

(52) U.S. Cl.
CPC ............... *F16L 59/06* (2013.01); *H01F 7/02* (2013.01); *H01F 7/0268* (2013.01); *F16C 2326/47* (2013.01); *F17C 2201/0133* (2013.01); *F17C 2203/017* (2013.01); *F17C 2223/0161* (2013.01); *F17C 2270/0194* (2013.01); *F17C 2270/0197* (2013.01)

(58) Field of Classification Search
USPC ...................................................... 244/172.3
See application file for complete search history.

(56) References Cited

U.S. PATENT DOCUMENTS

| | | | | |
|---|---|---|---|---|
| 6,267,330 | B1* | 7/2001 | Cochran | B64G 1/402 244/172.2 |
| 7,559,508 | B1* | 7/2009 | Taylor | B64G 1/242 244/172.2 |
| 9,550,584 | B1* | 1/2017 | Harvey | B64G 1/222 |
| 2005/0089661 | A1 | 4/2005 | Hogenson et al. | |
| 2006/0091262 | A1 | 5/2006 | Belisle | |
| 2010/0244343 | A1* | 9/2010 | Hull | H02K 7/025 269/8 |
| 2015/0360792 | A1* | 12/2015 | Faure | F17C 13/008 244/135 R |
| 2017/0101170 | A1* | 4/2017 | Clemen, Jr. et al. | B64C 1/38 |
| 2017/0126087 | A1* | 5/2017 | Soderberg | H02K 1/17 |
| 2018/0166946 | A1* | 6/2018 | Walsh | H02K 7/025 |

FOREIGN PATENT DOCUMENTS

| | | |
|---|---|---|
| JP | H0328600 A | 2/1991 |
| WO | 2006034521 A1 | 4/2006 |
| WO | 2008036991 A1 | 4/2008 |

OTHER PUBLICATIONS

Extended European Search Report for corresponding EP Application No. 19172695.9-1010 dated Sep. 18, 2019 (22 pages).
Eichenberg et al.; "Development and Testing of a Radial Halbach Magnetic Bearing" NASA STI Program; Dec. 2006; 40 pages.
Simon et al.; "Diamagnetically Stabilized Magnet Levitation" American Journal of Physiology; vol. 69, Is.. 6; 2001; 37 pages.
Parmley; "Feasibility Study for Long Lifetime Helium Dewar" NASA Final Report; 1981; 26 pages.
Simon et al.; "Diamagnetic Levitation: Flying Frogs and Floating Magnets" Journal of Applied Physics; vol. 87, No. 9; May 2000; 5 pages.
Parmley et al., "Test and Evaluate Passive Orbital Disconnect Struts" NASA Contractor Report; Aug. 1985; 81 pages.
Ames Research Center, "Small, Lightweight, Collapsible Glove Box" NASA Tech Briefs; Jul. 2009; 2 pages.
"Fifth International Symposium on Magnetic Suspension Technology" NASA Conference; Jul. 2000; 746 pages split between 5 PDFs.
"International Symposium on Magnetic Suspension Technology" NASA Conference Publication; August 19991; 929 pages split between 5 PDFs.
"Second International Symposium on Magnetic Suspension Technology" NASA Conference; May 1994; 722 pages split between 3 PDFs.
"Third International Symposium on Magnetic Suspension Technology" NASA Conference; Jul. 1996; 851 pages split between 3 PDFs.

* cited by examiner

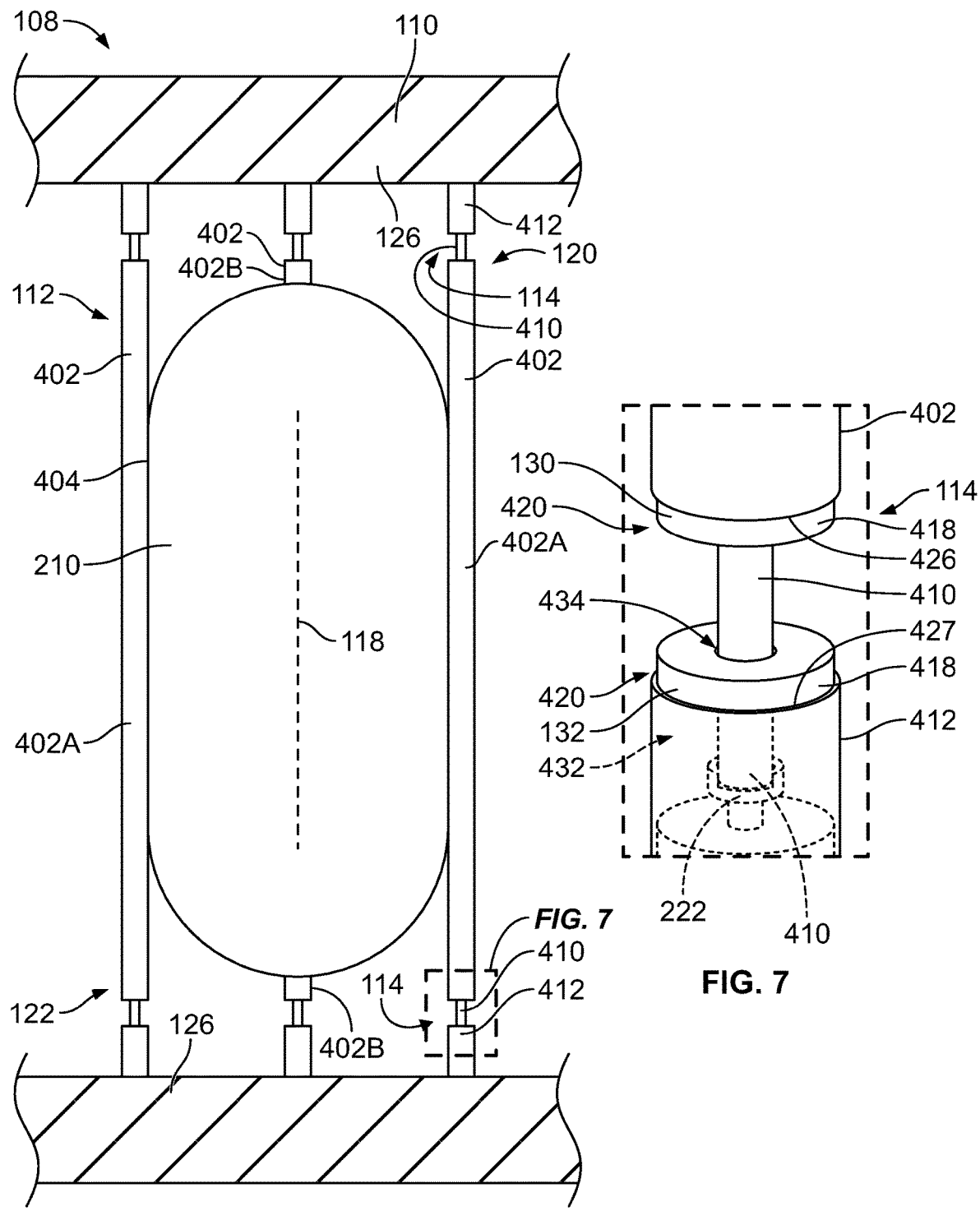

US 11,371,557 B2

TANK SUPPORT ASSEMBLY FOR A VEHICLE

FIELD

Examples of the present disclosure generally relate to assemblies within vehicles that support storage tanks, such as cryogenic storage tanks within spacecraft.

BACKGROUND

Some vehicles transport very cold cryogenic fluids, such as liquid hydrogen, within storage tanks. The vehicles may be spacecraft that travel within microgravity environments within space. The cryogenic fluids may be used for propellants (e.g., rocket fuel) and/or heating and cooling systems for sensitive electronic instruments (and/or other systems) onboard the vehicle carrying the storage tank. Alternatively, the vehicle carrying the storage tank may supply the cryogenic fluids to another vehicle or station.

Cryogenic fluids are difficult to store for long durations because of a process known as boil-off. Heat transfer into the tanks causes the liquid to vaporize into a gas, thereby increasing the pressure of the tank. The excess gas must be dumped from the tank to avoid over-pressurization and thus usable fluid is lost over time. Some of the heat at the storage tank may be received via solar radiation that impinges upon the outer surfaces of the vehicle and conductively transfers through vehicle structures to the tank. Additional heat sources may include the electronics (e.g., avionics) onboard the vehicle, such as computing devices and sensors, and the propulsion system. For example, when rocket thrusters are activated, some heat may be conductively conveyed along vehicle structures to the tank. Due to boil-off caused by conductive heat transfer, cryogenic fluids stored according to known systems are not able to be stored for sufficient durations to enable long trips (e.g., space missions). For example, known systems are not able to store cryogenic fluids on vehicles for more than a day or so, substantially restricting the duration and distance of available trips when transporting cryogenic fluids.

SUMMARY

Certain examples of the present disclosure provide a tank support assembly for a vehicle that includes a vehicle structure and a storage tank assembly. The storage tank assembly is held in place relative to the vehicle structure via a magnetic support system. The magnetic support system includes tank magnets affixed to the storage tank assembly and structure magnets affixed to the vehicle structure. The tank magnets interact with the structure magnets to passively provide repulsive magnetic forces that constrain movement of the storage tank assembly relative to the vehicle structure without the tank magnets mechanically engaging the structure magnets.

Certain examples of the present disclosure provide a tank support assembly for a vehicle that includes a vehicle structure and a storage tank assembly. The vehicle structure includes a plurality of structure magnets affixed thereto. The storage tank assembly is oriented along a height axis between top end thereof and a bottom end thereof that is opposite the top end. The storage tank assembly includes a plurality of tank magnets affixed thereto. The tank magnets include a top magnet affixed along the top end of the storage tank assembly and a bottom magnet affixed along the bottom end of the storage tank assembly. The top magnet and the bottom magnet interact with corresponding structure magnets located above and below the top and bottom ends of the storage tank assembly, respectively, to passively provide repulsive magnetic forces that vertically support and suspend the storage tank assembly along the height axis relative to the vehicle structure without the tank magnets mechanically engaging the structure magnets.

Certain examples of the present disclosure provide a method for supporting a storage tank assembly in a vehicle. The method includes loading cryogenic fluid into a storage tank assembly within a vehicle structure of a vehicle, and suspending the storage tank assembly relative to the vehicle structure via a magnetic support system. The magnetic support system includes tank magnets affixed to the storage tank assembly and structure magnets affixed to the vehicle structure. The tank magnets interact with the structure magnets to passively provide repulsive magnetic forces that suspend the storage tank assembly relative to the vehicle structure without the tank magnets mechanically engaging the structure magnets.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein:

FIG. 6 is a side view of the tank support assembly according to another example.

FIG. 7 is a close-up perspective view of a portion of the tank support assembly of FIG. 6 showing a post of the storage tank assembly, a post of a vehicle structure, and a pin that connects the two posts.

DETAILED DESCRIPTION

Figure 1:
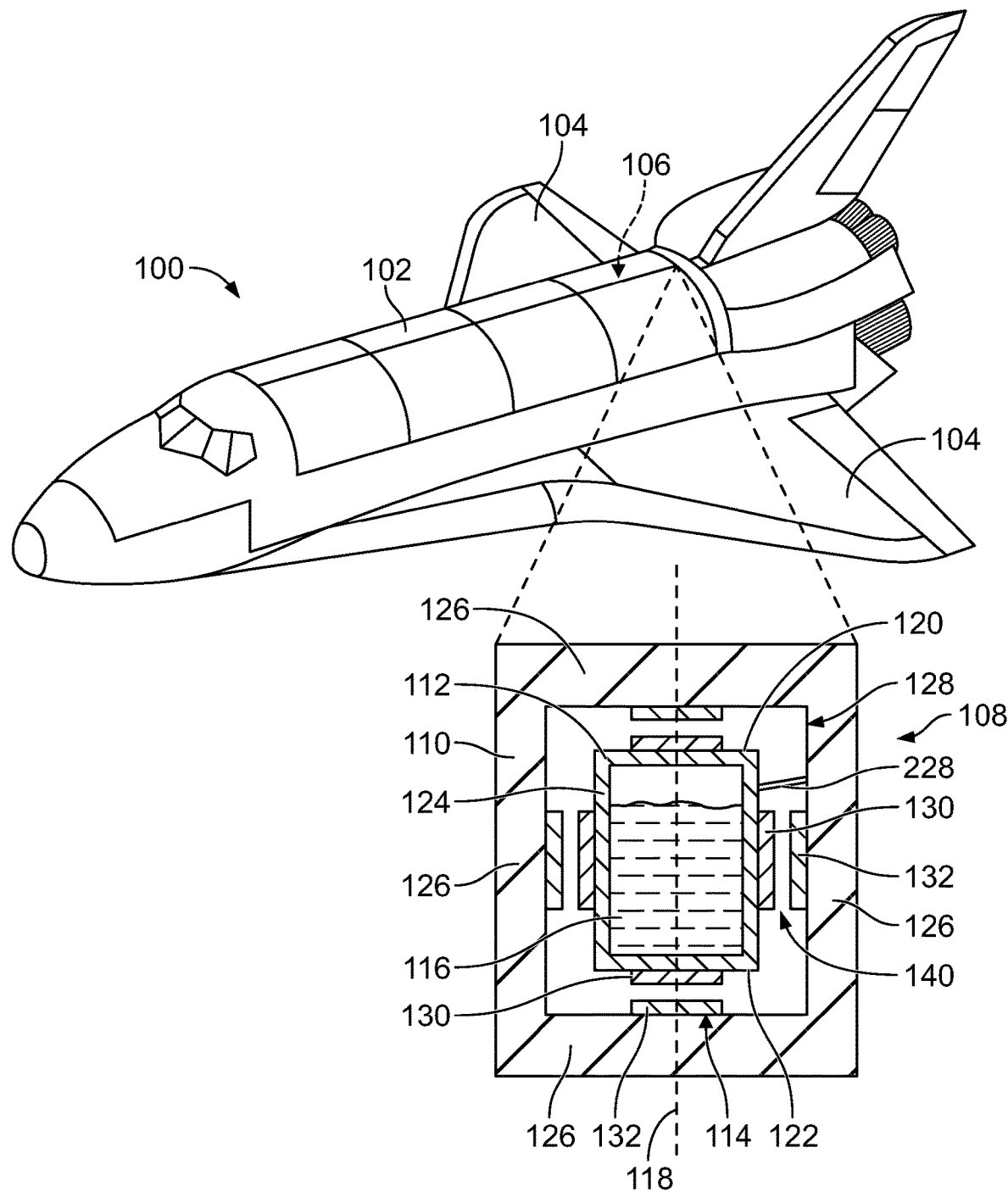
FIG. 1 is a perspective view of a vehicle according to an example of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition may include additional elements not having that condition.

A need exists for a system or assembly that reduces heat transfer from a vehicle structure to a storage tank containing cryogenic fluid to reduce boil-off of the cryogenic fluid and thereby increase the storage life of the cryogenic fluid. Preferably, such a system or assembly would be passive and not require energy stored within the vehicle, such as through active cooling of the storage tank or active support of the storage tank using electromagnets.

With those needs in mind, certain examples of the present disclosure provide a tank support assembly that reduces thermal conduction paths to cryogenic storage tanks on vehicles operating in microgravity environments via utilizing magnetic materials. The vehicles may be manned or unmanned spacecraft, satellites, space stations, or the like. The magnetic materials constrain the tank to the vehicle while significantly reducing or eliminating the structural linkages between the tank and the vehicle. Reducing or eliminating the structural linkages reduces conductive heat transfer to the tank from heat sources like the sun, on-board electronics, and propulsion systems. The reduction in heat transfer to the tank decreases boil-off of the cryogenic fluid within the tank, increasing the feasibility of using cryogenic fluids for long duration space missions.

Certain examples provide a tank support assembly for a vehicle that includes a vehicle structure and a storage tank assembly. The storage tank assembly is held in place relative to the vehicle structure via a magnetic support system. The magnetic support system includes tank magnets affixed to the storage tank assembly and structure magnets affixed to the vehicle structure. The tank magnets and structure magnets include permanent magnets (i.e. materials which have strong ferromagnetic properties) and/or diamagnets (i.e. materials which have strong diamagnetic properties). The tank magnets interact with the structure magnets to passively provide repulsive magnetic forces that constrain movement of the storage tank assembly relative to the vehicle structure in a microgravity environment without the tank magnets mechanically engaging the structure magnets.

The tank support assembly includes one or more diamagnets and/or mechanical support struts to stabilize the storage tank assembly relative to the vehicle structure. The mechanical struts tether the storage tank assembly to the vehicle structure. It is known that permanent magnets alone are not sufficient to stabilize the storage tank assembly, as described in Earnshaw's Theorem. For example, the tank support assembly in various examples described herein may include permanent magnets with one or more mechanical struts, permanent magnets with diamagnets, or permanent magnets with both diamagnets and one or more mechanical struts.

The storage tank assembly may contain a cryogenic fluid, such as liquid hydrogen, liquid oxygen, or the like. The vehicle within the microgravity environment may be a spacecraft traveling through space. The spacecraft may be in orbit around the Earth or another planet, or located at a stable or partially stable gravitational well known as a Lagrange point.

The diamagnets described herein are materials with strong diamagnetic properties that repel an external magnetic field to which the materials are exposed, and the extent of repulsion is proportional to the strength of the applied magnetic field. Via this repulsion, the diamagnets passively provide restoring forces to balance and stabilize the storage tank assembly relative to the vehicle structure. The diamagnet may be affixed to the storage tank assembly, representing tank magnets, and/or affixed to the vehicle structure, representing structure magnets. In one or more examples described herein, the repulsive magnetic forces provided by the permanent magnets and the restoring forces provided by the diamagnets may fully suspend the storage tank assembly relative to the vehicle structure, at least in microgravity environments where there is no significant gravitational force to withstand. The diamagnets also constrain the storage tank assembly from moving out of position and leaving the vehicle. For example, there may be no mechanical engagement between the storage tank assembly and the vehicle structure, direct or indirect, such that a continuous gap surrounds an outer surface of the storage tank assembly. The full suspension of the storage tank assembly reduces heat transfer to the storage tank assembly by eliminating thermal conduction paths between the vehicle and the storage tank assembly. Reducing heat transfer conserves the cryogenic fluid within the storage tank assembly for longer periods of time, allowing for transporting the cryogenic fluid along longer trips covering greater distances.

The vehicle in at least one example includes one or more mechanical struts that couple the storage tank assembly to the vehicle structure when in the microgravity environment. Unlike known tank support assemblies that utilize mechanical struts to support the entire load of the storage tank assembly, the mechanical struts described in the examples herein are utilized for stabilizing the storage tank assembly that is suspended and constrained from leaving the vehicle by the magnetic support system. As used herein, suspension of the storage tank assembly means that the non-contact repulsive forces provided by the magnetic support system at least partially support the weight of the storage tank assembly relative to the vehicle. The one or more mechanical struts or diamagnets stabilize the suspended storage tank assembly. The mechanical struts utilized in the examples described herein may be fewer, smaller, and/or less robust than the mechanical struts in known tank support assemblies because the mechanical struts described herein support less of the load than the struts in the known tank support assemblies. For example, the mechanical struts described herein may be composed of material that is more thermally insulative (e.g., less thermally conductive) than the known struts, such as fiber-reinforced composites, fiberglass, plastics, or the like instead of metals. Although the use of mechanical struts establishes thermal conduction paths from the vehicle to the storage tank assembly, which could lead to boil-off, the reduced number, size, and thermal conductivity of the mechanical struts relative to the known tank support assemblies may substantially reduce the amount of heat transfer to the storage tank assembly, thereby extending the storage life of the cryogenic fluid.

One or more examples of the present disclosure utilize permanent magnets, and optionally also diamagnets, to eliminate some or all of the mechanical supports used in known tank support assemblies for in-space operation of spacecraft. The magnets and diamagnets allow the storage tank assembly to achieve stable suspension relative to a vehicle structure surrounding the storage tank assembly. In one or more examples, the magnetic suspension is achieved in microgravity environments, such as in free-fall while the spacecraft is in orbit. The vehicle may have frangible and/or detachable mechanical elements that support and secure the tank during launch and uncouple from the tank upon reaching a microgravity environment. In the microgravity environment, the magnetic support system can meet all loading and vibrational requirements.

The magnetic support system may include permanent magnets placed at strategic locations on the storage tank assembly that pair with magnets attached to the vehicle structure surrounding the tank to create an unstable equilibrium point at a desired steady state position. Diamagnets and/or minimal mechanical struts provide restoring forces for stabilizing the tank at the steady state position, to achieve a stable equilibrium point. The magnetic support system may be entirely passive, meaning that there is no power requirement to support and suspend the tank. The magnets on the tank interact with the magnets on the vehicle structure to passively provide repulsive magnetic forces that suspend the tank. For example, the magnetic support system may not include electromagnets, superconductors which require active cooling systems, or the like.

A technical effect of one or more of the examples of the tank support assembly described herein is an extended storage life of cryogenic fluids within a storage tank assembly carried by a vehicle in microgravity environments, which enables longer mission durations and farther travel distances. Because there may be less boil-off of the cryogenic fluid, the vehicle may be able to transport more cryogenic fluid to a destination, such as another vehicle or a space station, for a given amount of energy expended during the trip than vehicles utilizing known tank support systems. Another technical effect may include energy conservation because the magnetic support system may be passive, without requiring an energy source to suspend the storage tank assembly. Another technical effect may be a weight savings through the reduction or complete elimination of heavy mechanical struts which would normally be necessary to fully support and suspend the storage tank assembly.

FIG. 1 is a perspective view of a vehicle 100 according to an example of the present disclosure. The vehicle 100 is a spacecraft in the illustrated example, and is configured to travel in microgravity environments. As used herein, microgravity environments experience reduced gravitational forces than the gravitational forces experienced on Earth (e.g., at sea level). For example, the vehicle 100 may travel in the microgravity environment of space, such as in orbit around the Earth or another planet. The vehicle 100 in the illustrated example is a shuttle designed to carry people and cargo, but the vehicle 100 in other examples may be an unmanned vehicle that does not carry people. The vehicle 100 includes a main body or fuselage 102 and wings 104 extending from the body 102. The vehicle 100 carries a payload (e.g., cargo and/or passengers) within one or more compartments 106 of the body 102.

The vehicle 100 includes a tank support assembly 108. The tank support assembly 108 includes a vehicle structure 110 and a storage tank assembly 112. The tank support assembly 108 also includes a magnetic support system 114 that supports and at least partially suspends the storage tank assembly 112 relative to the vehicle structure 110. A cross-sectional illustration of the tank support assembly 108 is shown in FIG. 1. The illustration in FIG. 1 is intended for introducing the components of the tank support assembly 108 and may not necessarily represent the shapes, sizes, and arrangement of the components thereof, which are shown in more detail in the following figures.

The storage tank assembly 112 is hollow and contains a cryogenic fluid 116. The cryogenic fluid 116 may be a propellant such as liquid hydrogen, liquid oxygen, or the like, stored at a very cold temperature. The storage tank assembly 112 may be insulated to reduce heat transfer from outside of the tank 112 into the cryogenic fluid 116. In the illustrated example, the storage tank assembly 112 is elongated along a height axis 118 of the storage tank assembly 112. For example, the storage tank assembly 112 may be cylindrical and oriented about the height axis 118. The storage tank assembly 112 extends along the height axis 118 from a top end 120 thereof to a bottom end 122 that is opposite the top end 120. The storage tank assembly 112 has one or more side walls 124 defining a perimeter of the tank 112. Each of the one or more side walls 124 extends from the top end 120 to the bottom end 122. For example, when the storage tank assembly 112 is cylindrical, a single side wall 124 may define a circumference of the tank 112, although two different portions of the side wall 124 are shown in the illustrated cross-section.

As used herein, relative or spatial terms such as "top," "bottom," "left," "right," "front", "rear", "upper," and "lower" are only used to identify and distinguish the referenced elements and do not necessarily require particular positions or orientations in the surrounding environment of the tank support assembly 108. For example, it is recognized that the vehicle 100 may rotate in space such that the top end 120 may be below the bottom end 122 relative to the direction of gravitational force experienced on Earth. The relative or spatial terms are therefore specific to the orientations depicted in the figures.

The vehicle structure 110 has walls 126 that at least partially surround the storage tank assembly 112. The walls 126 at least partially define a chamber 128 in which the storage tank assembly 112 is disposed. The tank support assembly 108 may be located within one of the compartments 106 of the body 102, and the vehicle structure 110 may represent part of, or may be attached to, the body 102. For example, the walls 126 may be interior walls of the body 102 that define one of the compartments 106. The illustrated cross-section shows that the walls 126 surround the tank 112 above and below the top and bottom ends 120, 122, and on both left and right sides of the one or more side walls 124. Although not shown, the vehicle structure 110 may also longitudinally surround the tank 112 both in front of (e.g., out of the page) and behind (e.g., into the page) the tank 112.

In FIG. 1, the vehicle structure 110 is mechanically spaced apart from the tank 112 via a gap 140 that fully surrounds the tank 112, such that the storage tank assembly 112 does not mechanically engage the vehicle structure 110. The tank 112 is supported and held in place relative to the vehicle structure 110 by the magnetic support system 114. The magnetic support system 114 includes a plurality of magnets. The magnets include both tank magnets 130 affixed to the storage tank assembly 112 and structure magnets 132 affixed to the vehicle structure 110. The tank magnets 130 interact with the structure magnets 132 to passively provide repulsive magnetic forces that constrain movement of the storage tank assembly 112 relative to the vehicle structure 110 in a microgravity environment without the tank magnets 130 mechanically engaging the structure magnets 132. At least some of the tank magnets 130 are permanent magnets. The tank magnets 130 are located at positions that correspond to positions of structure magnets 132 to define match or corresponding pairs that repel each other. This repulsion between the pairs of magnets 130, 132 prevents the tank magnets 130 from mechanically engaging the structure magnets 132. The tank magnets 130 in the illustrated example are affixed to the top end 120, the bottom end 122, and the one or more side walls 124 of the storage tank assembly 112. The repulsion between these tank magnets 130 and the associated structure magnets 132 establishes and maintains the gap 140 between the storage tank assembly 112 and the vehicle structure 110, preventing thermal conduction paths from the vehicle structure 110 to the storage tank assembly 112. The term "magnets" used herein, unless otherwise specified as permanent magnets or diamagnets, may represent permanent magnets only, diamagnets only, or both permanent magnets and diamagnets.

The tank support assembly 108 of the vehicle 100 may include one or more mechanical struts 228, such as straps, posts, tubes, chains, or the like, that mechanically connect the storage tank assembly 112 to the vehicle structure 110. The one or more mechanical struts 228 are utilized to stabilize the passive magnetic repulsive forces, not to support the full load of the storage tank assembly 112. Such mechanical struts 228 may be few in number, small in size and contact area with the tank 112, thermally insulative in construction material, and/or the like to reduce thermal conduction from the vehicle structure 110 to the tank 112 across the struts. For example, only one mechanical strut 228 is shown in FIG. 1. Alternatively, diamagnets may be used in addition to or instead of mechanical struts 228 to provide stability to the suspended storage tank assembly 112.

Figure 2:
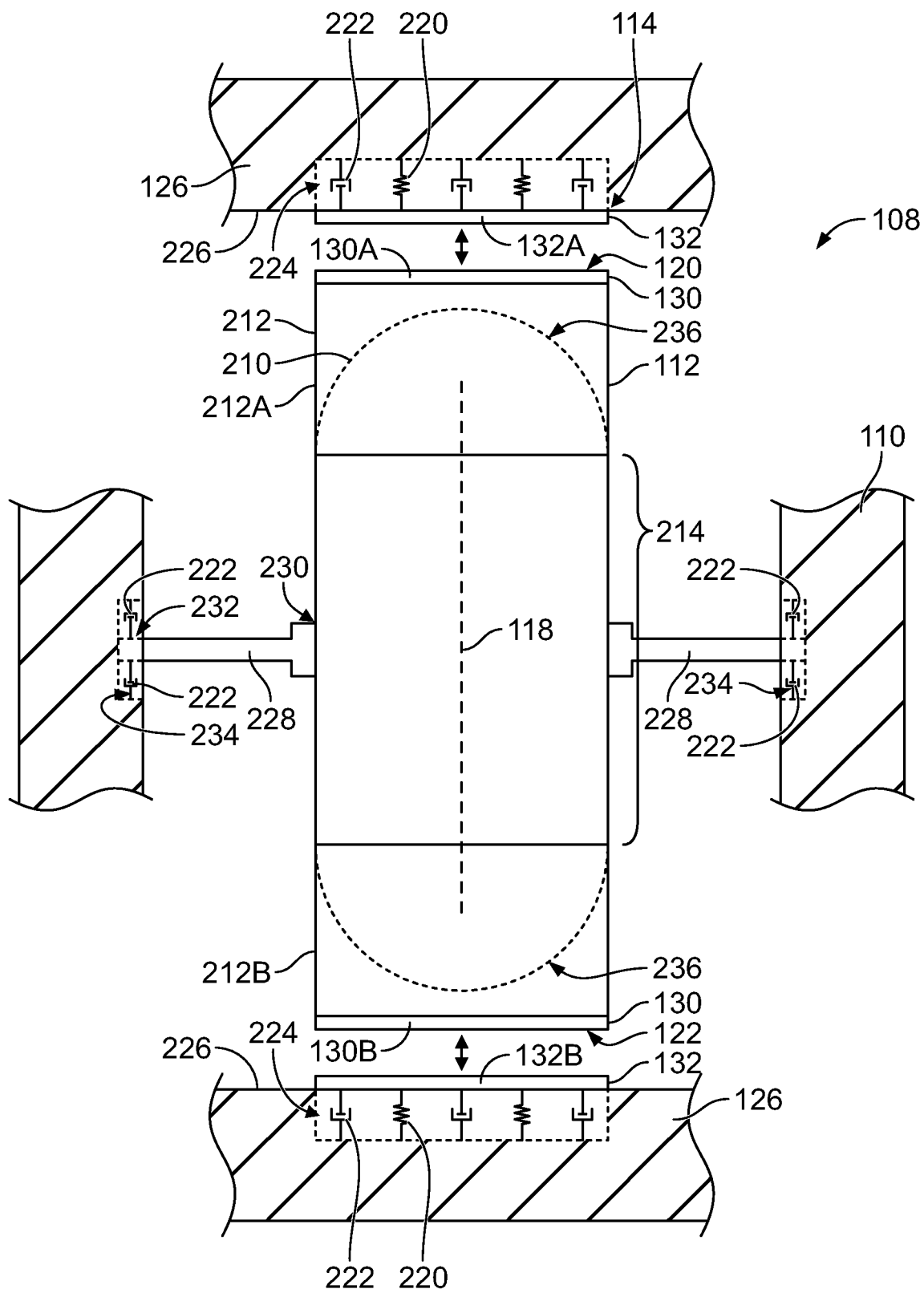
FIG. 2 is a side view of a tank support assembly of the vehicle according to an example of the present disclosure.

FIG. 2 is a side view of the tank support assembly 108 according to an example of the present disclosure. In the illustrated example, the storage tank assembly 112 includes tank magnets 130 along the top and bottom ends 120, 122 thereof. For example, a top tank magnet 130A is a fixed along the top end 120, and a bottom tank magnet 130B is a fixed along the bottom end 122. The top and bottom tank magnets 130A, 130B are referred to herein as top magnet 130A and bottom magnet 103B, respectively. The top and bottom magnets 103A, 130B are permanent magnets that have ferromagnetic properties. For example, the magnets 130A, 130B may include ferrous metals containing iron.

The top and bottom magnets 130A, 130B interact with corresponding structure magnets 132 located above and below the storage tank assembly 112 to vertically support and suspend the storage tank assembly 112 along the height axis 118. The top magnet 130A repels from an upper structure magnet 132A located above the top end 120 of the tank 112. The top magnet 130A may repel from the upper structure magnet 132A due to like poles facing each other (e.g., north-north or south-south). The bottom magnet 130B repels from a lower structure magnet 132B located below the bottom end 122 of the tank 112. The interactions between the top magnet 130A and the upper structure magnet 132A, and between the bottom magnet 130B and the lower structure magnet 132B, passively provide repulsive magnetic forces that vertically support and suspend the storage tank assembly 112 relative to the vehicle structure 110 in a microgravity environment. Due to the repulsive forces, the top magnet 130A may not mechanically engage the upper structure magnet 132A, and the bottom magnet 130B may not mechanically engage the lower structure magnet 132B.

The storage tank assembly 112 may include a tank 210 and one or more tank skirts 212. The tank 210 of the storage tank assembly 112 contains the cryogenic fluid 116 (shown in FIG. 1) therein. In the illustrated example, the tank 210 is pill-shaped with rounded dome-shaped ends 236 and is elongated along the height axis 118. The one or more tank skirts 212 surround the dome-shaped ends 236. The tank skirts 212 extend from the tank 210 and define the top end 120 and the bottom end 122 of the storage tank assembly 112. The tank magnets 130 in the illustrated example include the top magnet 130A mounted on the top end 120 of the storage tank assembly 112 and the bottom magnet 130B mounted on the bottom end 122 of the storage tank assembly 112. For example, the tank skirts 212 include an upper tank skirt 212A that defines the top end 120, and a lower tank skirt 212B that defines the bottom end 122. The top magnet 130A is mounted on the upper tank skirt 212A, and the bottom magnet 130B is mounted on the lower tank skirt 212B. The upper and lower tank skirts 212A, 212B may be spaced apart from each other by a middle region 214 of the storage tank assembly 112. Alternatively, the upper and lower tank skirts 212A, 212B may be connected to each other across the middle region 214. Although not shown, the top and bottom magnets 130A, 130B may have annular shapes that extend along peripheral edges of the cylindrical storage tank assembly 112.

The upper and lower structure magnets 132A, 132B may be permanent magnets. In order to provide stability between the structure magnets 132A, 132B and the corresponding tank magnets 130A, 130B, the structure magnets 132A, 132B are movably mounted onto respective walls 126 of the vehicle structure 110. For example, springs 220 and dampers 222 may be disposed between the structure magnets 132A, 132B and the corresponding walls 126 of the vehicle structure 110 to enable the structure magnets 132A, 132B to move axially towards and away from the storage tank assembly 112 based on the repulsive magnetic forces. The dampers 222 may be dashpots or other force dampening devices. The springs 220 and dampers 222 are optionally embedded within recesses 224 in the walls 126 of the vehicle structure 110. Alternatively, the springs 220 and dampers 222 may protrude from interior surfaces 226 of the walls 126 instead of being recessed from the interior surfaces 226 within the walls 126.

In an alternative example, the upper and lower structure magnets 132A, 132B may be diamagnets instead of permanent magnets. Diamagnets have strong diamagnetic properties that repel a magnetic field to which the diamagnets are exposed in proportion to the force of the magnetic field. Diamagnetic materials include pyrolytic graphite, bismuth, copper, or the like.

In the illustrated example, the tank support assembly 108 includes at least one mechanical strut 228 that extends from the storage tank assembly 112 to the vehicle structure 110. Each mechanical strut 228 is coupled to both the storage tank assembly 112 and the vehicle structure 110. Two struts 228 are shown in FIG. 2. The struts 228 are configured to constrain lateral, longitudinal, and/or rotational movement of the storage tank assembly 112 relative to the vehicle structure 110. The struts 228 have tank interfaces 230 and structure interfaces 232. The tank interfaces 230 are mechanically coupled to the side walls 124 of the storage tank assembly 112. In the illustrated example, the tank interfaces 230 engage the middle region 214, but may engage the dome-shaped ends 236 or the tank skirts 212 in another example. The structure interfaces 232 are mechanically coupled to the vehicle structure 110. In the illustrated example, the structure interfaces 232 extend into slots 234 in the walls 126 of the vehicle structure 110. Each of the structure interfaces 232 is held between two dampers 222 within the corresponding slot 234. The slots 234 allow vertical movement of the struts 228 (e.g., parallel to the height axis 118) with the movement of the storage tank assembly 112. The dampers 222 limit or dampen such vertical movement. The struts 228 are configured to stabilize and balance the storage tank assembly 112 that is suspended by the magnetic support system 114. The two illustrated struts 228 extend laterally left and right of the tank 112. Optionally, one or two additional struts 228 may be installed that extend longitudinally forward (e.g., out of the page)

and/or backward (e.g., into the page) from the tank 112 to restrain movement or tilt in the forward and backward directions. The struts 228 tether the tank 112 to the vehicle structure 110, such that the magnetic support system 114 suspends the tank 112 and constrains the tank 112 from leaving the vehicle 100.

Although the mechanical struts 228 do provide thermal conductive pathways from the vehicle structure 110 to the storage tank assembly 112, the amount of heat transfer to the storage tank assembly 112 is mitigated in several ways. For example, because the struts 228 are used for stability, and not for supporting the entire load of the storage tank assembly 112, very few struts 228 may be required. The illustrated example may include less than or equal to four struts 228, which may be fewer than the number of struts installed in known tank support systems. Furthermore, the struts 228 may be smaller (e.g., thinner) than the struts used in the known tank support systems for the same reason. The struts 228 also may be non-metallic and at least partially composed of thermally insulative materials that hinder thermal conduction. The thermally insulative materials may include fiberglass, fiber-reinforced composites, plastics, or the like. The contact surface areas at the structure interfaces 232 between the struts 228 and the vehicle structure 110 may be relatively small, further reducing conductive heat transfer between the vehicle structure 110 and the storage tank assembly 112. Furthermore, the contact surface areas at the structure interfaces 232 can be reduced by using a linear ball bearing or linear rail that allows the strut 228 to slide up and down within the slot 234 of the vehicle structure 110. Such reduced contact area (e.g., relative to known mechanical strut support systems) is permissible because the struts 228 do not support the full mass of the tank 112, but rather supplement the magnetic support system 114.

Although not shown in FIG. 2, the magnetic support system 114 may include additional tank magnets 130 that interact with structure magnets 132 affixed to the vehicle structure 110 along the sides of the tank 112. In an alternative example, at least some of these tank magnets 130 and/or structure magnets 132 may be diamagnets that provide stability. The diamagnets may replace the mechanical struts 228 shown in FIG. 2 to provide stabilized, full suspension of the storage tank assembly 112.

Figure 3:
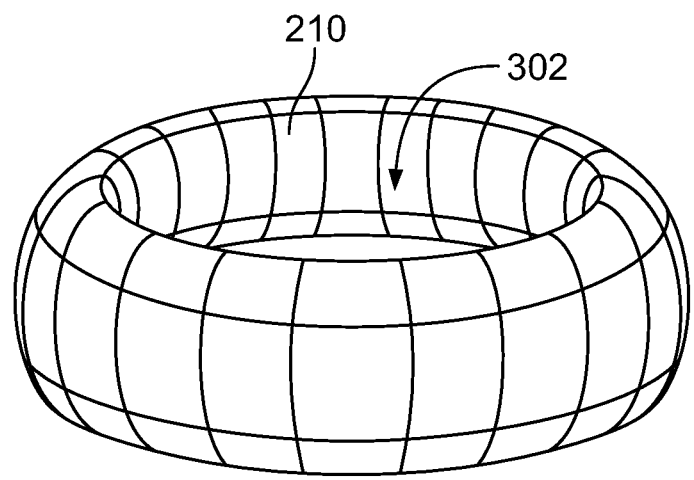
FIG. 3 is a perspective view of a tank of the tank support assembly according to another example.

FIG. 3 is a perspective view of the tank 210 of the storage tank assembly 112 according to another example. The tank 210 has a toroid shape, and defines a central cavity 302. For example, the tank 210 has a closed, annular ring shape. The tank 210 contains cryogenic fluid therein, such that the cryogenic fluid within the tank 210 encircles the central cavity 302.

Figure 4:
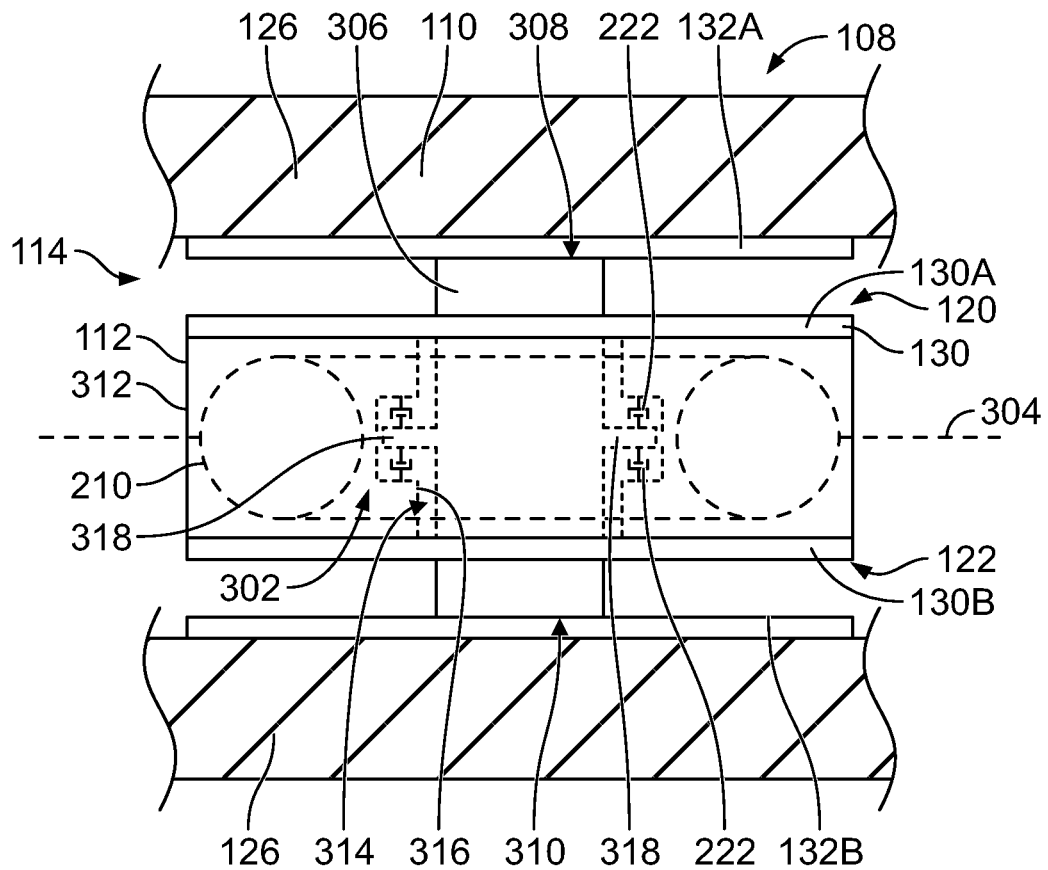
FIG. 4 is a side view of the tank support assembly according to an example that utilizes the tank shown in FIG. 3.

FIG. 4 is a side view of the tank support assembly 108 according to an example that utilizes the tank 210 shown in FIG. 3. In the illustrated example, the storage tank assembly 112 is oriented along a toroid plane 304. The storage tank assembly 112 includes the toroid tank 210 and a housing member 312 that surrounds and holds the tank 210. The housing member 312 defines both the top end 120 and the bottom end 122 of the storage tank assembly 112. The top and bottom ends 120, 122 of the housing member 312 may be planar and oriented parallel to the toroid plane 304. The top tank magnet 130A of the tank magnets 130 is mounted to the top end 120, and the bottom tank magnet 130B is mounted to the bottom end 122.

In the illustrated example, the vehicle structure 110 includes a central column 306 that extends through the central cavity 302 of the storage tank assembly 112. The central column 306 has a first end 308 above the top end 120 of the storage tank assembly 112 and a second end 310 (opposite the first end 308) below the bottom end 122 of the storage tank assembly 112. The first and second ends 308, 310 are mounted to corresponding walls 126 of the vehicle structure 110.

The storage tank assembly 112 is movable relative to the vehicle structure 110 axially along the length of the central column 306 based on the passive repulsive magnetic forces provided by the magnetic support system 114. For example, the top tank magnet 130A repels the upper structure magnet 132A, and the bottom tank magnet 130B repels the lower structure magnet 132B, thereby suspending the storage tank assembly 112 between the structure magnets 132A, 132B. The repulsive magnetic forces are generally parallel to the axis of the central column 306 and cause the storage tank assembly 112 to move at least slightly along the length of the central column 306.

The housing member 312 defines a central channel 314 that aligns with the central cavity 302 of the tank 210. The central column 306 extends through the central channel 314. The central channel 314 of the housing member 312 may have a smaller diameter than the central cavity 302 of the tank 210, such that an inner surface 316 of the housing member 312 is radially closer to the central column 306 than the proximity of an inner diameter of the tank 210 to the central column 306. In the illustrated example, the central column 306 includes column fingers 318 that project laterally and/or radially from the central column 306. The column fingers 318 may be elongated parallel to the toroid plane 304 and perpendicular to the axis of the central column 306. The column fingers 318 may engage the housing member 312 indirectly via dampers 222 disposed between the column fingers 318 and the housing member 312. The engagement of the column fingers 318 and the housing member 312, via the dampers 222, stabilize the storage tank assembly 112 relative to the vehicle structure 110. For example, the tanks magnets 130A, 130B and the structure magnets 132A, 132B may all be permanent magnets in an example, so the storage tank assembly 112 may not be able to remain in a stable stationary equilibrium based only on the repulsive magnetic forces provided by these permanent magnets, as described in Earnshaw's theorem. The column fingers 318 of the central column 306 indirectly engage the storage tank assembly 112 to stabilize the storage tank assembly 112. The dampers 222 dampen axial movement of the storage tank assembly 112 along the central column 306 to reduce tilt and vibration.

Although the tank support assembly 108 of FIG. 4 includes the toroid storage tank assembly 112 shown in FIG. 3, it is recognized that the storage tank assembly 112 may have other shapes and still be utilized in the example shown in FIG. 4. For example, the tank 210 of the storage tank assembly 112 according to an alternative example may be cylindrical and define an opening that extends axially through a height of the tank 210. The central column 306 may extend through the opening of the cylindrical tank 210, similar to how the central column 306 extends through the central cavity 302 in FIG. 4.

Figure 5:
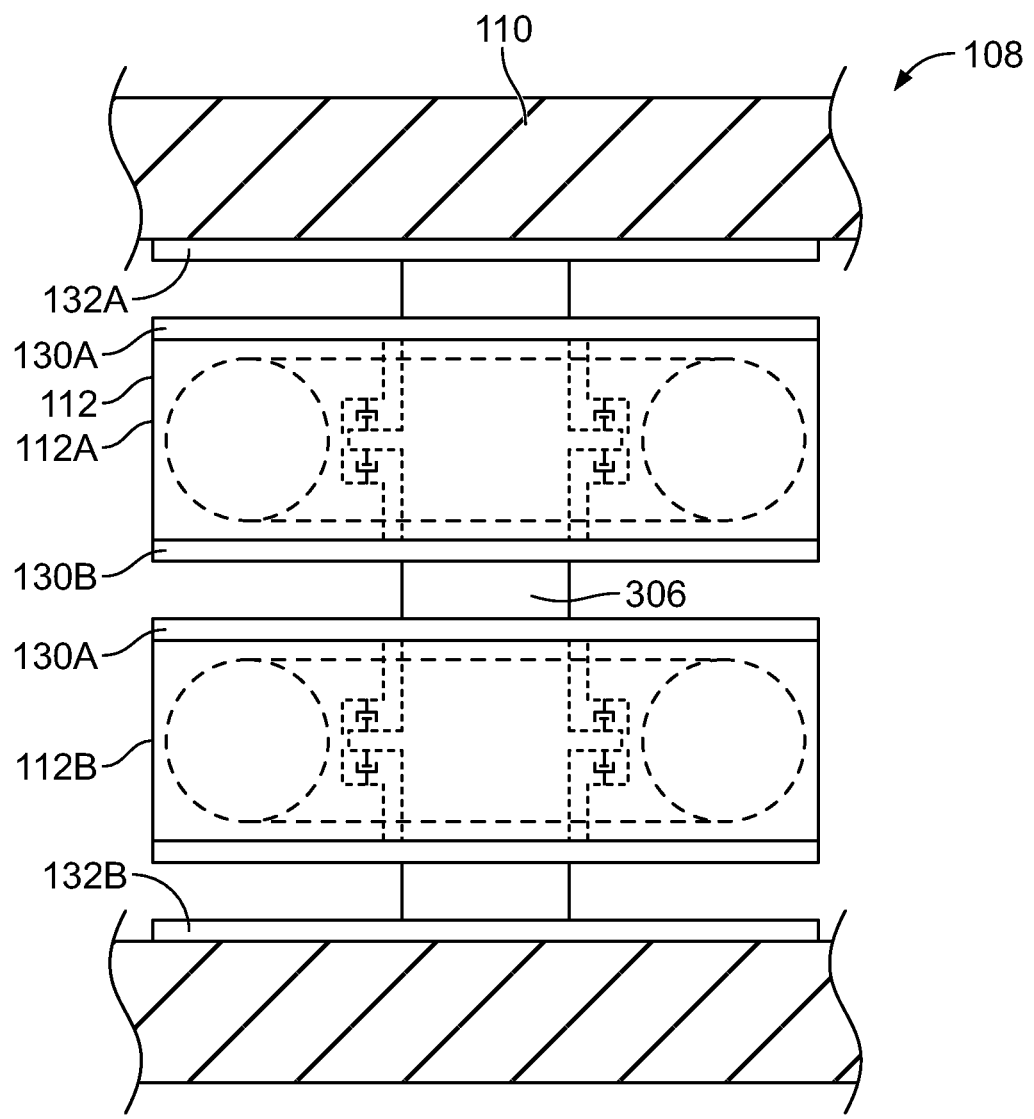
FIG. 5 is a side view of an optional variation of the tank support assembly shown in FIG. 4.

FIG. 5 is a side view of an optional variation of the tank support assembly 108 shown in FIG. 4. The tank support assembly 108 in FIG. 5 includes multiple storage tank assemblies 112. The storage tank assemblies 112 are stacked axially along the length of the central column 306 and located between the upper structure magnet 132A and the lower structure magnet 132B of the vehicle structure 110. Two storage tank assemblies 112 are shown in the illustrated example. Each of the storage tank assemblies 112 is the same as the storage tank assembly 112 shown in FIG. 4. For example, a first tank 112A of the two storage tank assemblies 112 is located between the upper structure magnet 132A and a second tank 112B of the two storage tank assemblies 112. The top tank magnet 130A of the first tank 112A interacts with and repels the upper structure magnet 132A. The bottom tank magnet 130B of the second tank 112B interacts with and repels the lower structure magnet 132B. The bottom tank magnet 130B of the first tank 112A interacts with and repels the top tank magnet 130A of the second tank 112B, which maintains a separation distance between the first and second tanks 112A, 112B. Although two tanks 112A, 112B are shown in the illustrated example, it is understood that the tank support assembly 108 may include one or more additional storage tank assemblies 112 by extending the length of the central column 306.

FIG. 6 is a side view of the tank support assembly 108 according to another example. In this example, multiple tank posts 402 are mounted to the storage tank assembly 112. The storage tank assembly 112 is elongated along the height axis 118 and the tank posts 402 are oriented parallel to the height axis 118. The tank posts 402 are mounted to an exterior tank surface 404 of the storage tank assembly 112, via welding, fasteners, straps, or the like, such that the tank posts 402 are rigidly secured in place relative to the storage tank assembly 112. The tank posts 402 extend beyond the tank 210 and define the top and bottom ends 120, 122 of the storage tank assembly 112. In the illustrated example, the storage tank assembly 112 shows three tank posts 402, including two fully-visible tank posts 402A and one tank post 402B which is partially obscured by the tank 210 as it is positioned behind (e.g., into the page) the tank 210. The storage tank assembly 112 optionally may include additional tank posts 402, such as a one on the front of the tank 210, opposite the tank post 402 which is partially obscured by the tank 210.

The tank posts 402 of the storage tank assembly 112 are coupled to the vehicle structure 110 and associated structure posts 412 thereof via pins 410. In the illustrated example, the pins 410 connect the tank posts 402 of the tank 112 to corresponding structure posts 412 of the vehicle structure 110. The structure posts 412 are mounted to the walls 126 above and below the storage tank assembly 112. The structure posts 412 are collinear with the corresponding tank posts 402 of the tank 112. The pins 410 are optionally affixed to or an integral part of either the tank posts 402 or the structure posts 412. In the illustrated example shown in FIG. 7, the pin 410 is secured or affixed to the tank post 402, and the structure post 412 defines a pin hole (not shown) to receive the pin 410. This orientation could be reversed in an alternative example such that the pin 410 is affixed to the structure post 412 and the tank post 402 would define a pin hole through which the pin 410 protrudes.

In the illustrated example, the magnetic support system 114 vertically supports the storage tank assembly 112 along the height axis 118 between the walls 126 of vehicle structure 110. The magnetic support system 114 is mounted to the tank posts 402 of the storage tank assembly 112 and the structure posts 412 of the vehicle structure 110. Although not shown in FIG. 6, a tank magnet 130 is affixed to each end of each tank post 402, and a structure magnet 132 is affixed to the end of each structure post 412. The tank magnets 130 mounted to the tank posts 402 at the top end 120 of the storage tank assembly 112 represent top magnets, and the tank magnets 130 mounted to the tank posts 402 at the bottom end 122 represent bottom magnets.

FIG. 7 is a close-up perspective view of a portion of the tank support assembly 108 of FIG. 6 showing one of the tank posts 402 of the storage tank assembly 112, one of the structure posts 412 of the vehicle structure 110, and the pin 410 that connects the two posts 402, 412. In the illustrated example, the tank magnets 130 and the structure magnets 132 of the magnetic support system 114 may be permanent magnets with like poles facing each other such that the magnets 130, 132 repel.

The tank magnets 130 and the corresponding structure magnets 132 define matched pairs 420. In the illustrated example, the tank magnet 130 of each pair 420 is mounted to the tank post 402, and the structure magnet 132 of the pair 420 is mounted to the structure post 412. The pin 410 extends through both magnets 130, 132. The pin 410 is fixedly secured to the tank post 402. The pin 410 extends into the pin hole in the structure post 412. The pin 410 can move relative to the structure magnet 132 and the structure post 412 through an opening 434 in the magnet 132, in and out of the pin hole of the structure post 412. The pin 410 can axially move with the tank post 402 and the tank magnet 130 relative to the structure post 412 and the structure magnet 132.

In at least one example, the magnets 130, 132 in the matched pairs 420 are spring magnets 418. The spring magnets 418 in each pair 420 are permanent magnets that repel when spaced apart less than an equilibrium distance and attract when spaced apart farther than the equilibrium distance. For example, the spring magnets 418 may have multiple magnetic poles on a single face. Optionally, the spring magnets 418 may be Polymagnets®, which is a trademark of Correlated Magnetics Research, LLC. The length of the equilibrium distance may depend on the size of the magnets, the arrangement of the poles along the magnets, and the materials of the magnets. In a non-limiting example, the equilibrium distance may be a value that is between about 1 mm and about 10 mm, such as about 5 mm. As used herein, a value prefaced by the term "about" includes values that are within a threshold of that value, such as within 1%, 5%, of 10% of that value. The tank magnet 130 mounted to the tank post 402 may be located at the equilibrium distance from the structure magnet 132 mounted to the structure post 412 in the position illustrated in FIG. 7. With additional reference to FIG. 6, the passive repulsive magnetic forces between the magnetic pairs 420 affixed to the ends of the tank posts 402 and the structure posts 412 suspend the storage tank assembly 112 between the vehicle structure 110 located above and below.

In FIG. 7, the tank magnet 130 is mounted to an end wall 426 of the tank post 402, and the structure magnet 132 is mounted to an end wall 427 of the structure post 412. The structure post 412 is at least partially hollow, and a damper 222 is fixedly mounted within a cavity 432 in the structure post 412. The pin 410 extends into the cavity 432 of the structure post 412 and engages the damper 222. The damper 222 reduces vibration and slows movement of the pin 410 (and the storage tank assembly 112 coupled thereto) relative to the vehicle structure 110. The pins 410 of the tank support assembly 108 provide lateral, longitudinal, and rotational support for the storage tank assembly 112. For example, the pin 410 affixed to the tank post 402 may mechanically engage the damper 222 to prevent rotation, tilt, and translation in directions other than the axial direction parallel to the height axis 118. The pins 410 may be composed of thermally insulative material, may be limited in number, and/or may have small contact areas with the posts 402 or 412 to substantially reduce thermal conduction from the vehicle structure 110 to the storage tank assembly 112 relative to known tank support systems.

In an alternative example, additional tank and/or structural magnets 130, 132 may be affixed to the tank post 402, the structural post 412 and/or the pin 410, thereby increasing the passive repulsive magnetic forces that suspend the storage tank assembly 112 relative to the vehicle structure 110.

Figure 8:
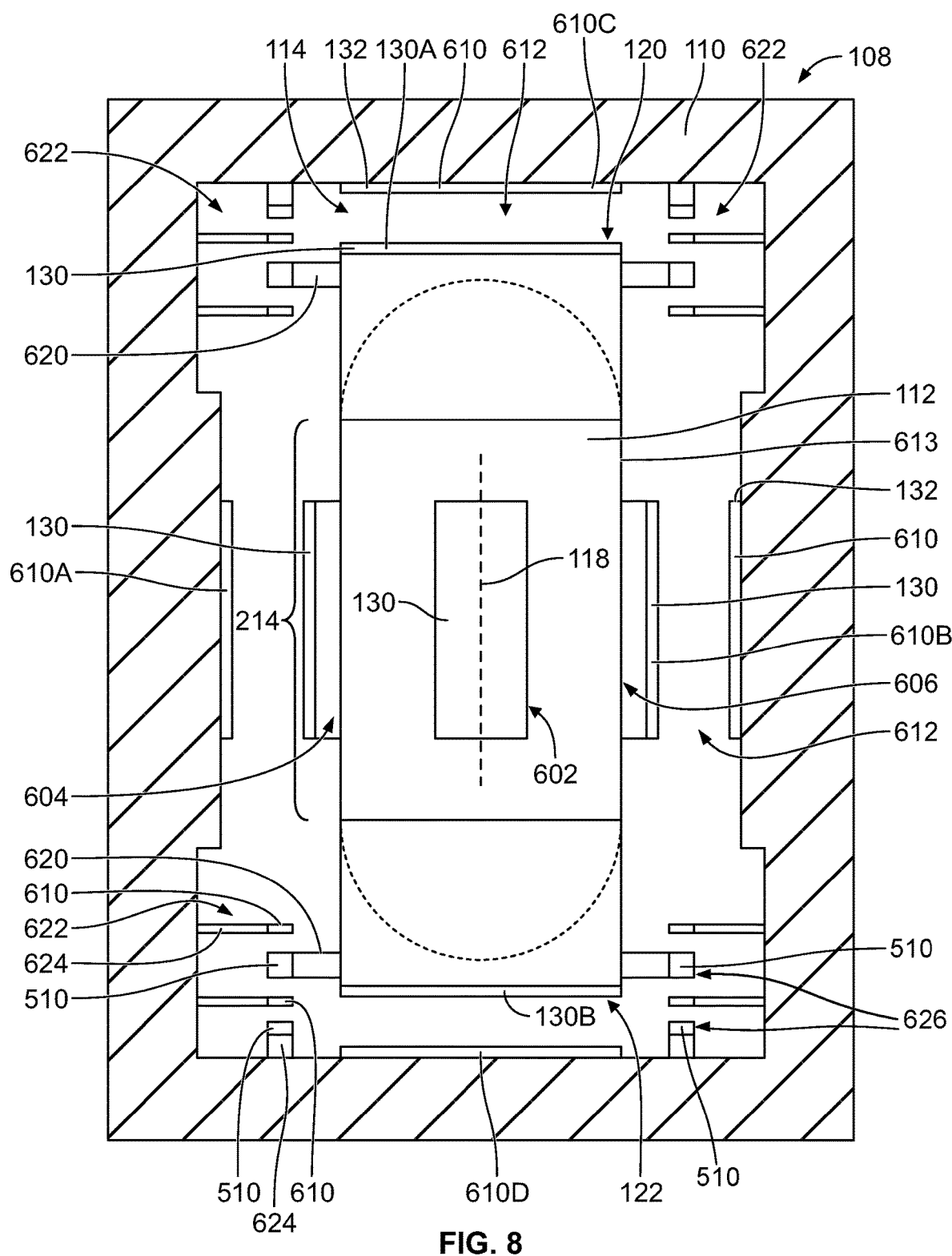
FIG. 8 is a side view of another example of the tank support assembly.

FIG. 8 is a side view of another example of the tank support assembly 108. In the illustrated example, the magnetic support system 114 fully structurally supports the storage tank assembly 112 without mechanical engagement between the storage tank assembly 112 and the vehicle structure 110. The storage tank assembly 112 is supported without forming any thermal conduction paths from the vehicle structure 110 to the storage tank assembly 112. The tank magnets 130 of the magnetic support system 114 include permanent magnets that are mounted are various locations along the storage tank assembly 112. For example, the tank magnets 130 include a top tank magnet 130A at the top end 120 and a bottom tank magnet 130B at the bottom end 122. The tank magnets 130 are also mounted on a front area 602 of the storage tank assembly 112, on a back area (not shown) of the storage tank assembly 112 opposite the front area 602, on a left area 604 of the storage tank assembly 112, and on a right area 606 of the storage tank assembly 112 opposite the left area 604. The front area 602, the back area, the left area 604, and the right area 606 are located between the top and bottom ends 120, 122 along the middle region 214 of the storage tank assembly 112.

The structure magnets 132 mounted to the vehicle structure 110 include diamagnets 610 that are located at corresponding positions across from the tank magnets 130. The diamagnets 610 are configured to provide restoring forces for stabilizing the storage tank assembly 112 relative to the vehicle structure 110. Diamagnets (e.g., diamagnetic materials) have diamagnetic properties that repel a magnetic field to which the diamagnets are exposed in proportion to the strength of the magnetic field. Diamagnetic materials include pyrolytic graphite, bismuth, copper, or the like.

The diamagnets 610 interact with the tank magnets 130 to constrain one or more of lateral, longitudinal, or rotational movement of the storage tank assembly 112 relative to the vehicle structure 110. For example, a left diamagnet 610A repels the tank magnet 130 mounted along the left area 604, and a right diamagnet 610B repels the tank magnet mounted along the right area 606 to laterally support the tank 112. A top diamagnet 610C repels the top tank magnet 130A, and a bottom diamagnet 610D repels the bottom tank magnet 130B to vertically support the tank 112 along the height axis 118. Although not shown, the diamagnets 610 may include front and back diamagnets that repel the tank magnet 130 at the front area 602 and the tank magnet at the back area. In an alternative example, at least some of these diamagnets 610A-D mounted to the vehicle structure 110 may be permanent magnets instead of diamagnets.

The passive repulsive forces between the tank magnets 130 and the structure magnets 132 may fully suspend the storage tank assembly 112 such that a gap 612 is defined between an outer surface 613 of the storage tank assembly 112 and the vehicle structure 110 without mechanical engagement across the gap 612. The outer surface 613 defines an outer perimeter of the storage tank assembly 112. For example, the tank magnets 130 may not engage the corresponding structure magnets 132 across the gap 612, such that the gap 612 is continuous and unbroken along the perimeter of the storage tank assembly 112. Due to the stabilization provided by the diamagnets, the magnetic support system 114 is able to fully suspend the storage tank assembly 112 without the use of mechanical struts to provide a mechanical tether between the storage tank assembly 112 and the vehicle structure 110. The diamagnets may allow for complete suspension of the storage tank assembly 112 (i.e. no mechanical engagement between the storage tank assembly 112 and the vehicle structure 110) without refuting or breaking Earnshaw's theorem. Optionally, one or more struts may be added to the tank support assembly 108 in the illustrated example to provide additional stabilization and physical constraints.

In the illustrated example, the storage tank assembly 112 also includes arms 620 that extend laterally outward. The arms 620 have strip magnets 510 or other permanent magnets mounted to the distal ends thereof. The strip magnets 510 are permanent magnets that have multiple segments with alternating polarity along lengths thereof. For example, along a single face the strip magnet 510 may include multiple north polarity segments interspersed with south polarity segments. The vehicle structure 110 includes multiple magnetic stack-ups 622 that interact with the strip magnets 510 on the arms 620. Each stack-up 622 includes multiple magnets. For example, the stack-ups 622 may each have a strip magnet 510 and two diamagnets 610 mounted to the vehicle structure 110. One of the diamagnets 610 is disposed between the two strip magnets 510. The other diamagnet 610 is located on the other side of the tank-mounted strip magnet 510 such that the diamagnets 610 are disposed on opposite sides of the tank-mounted strip magnet 510. The magnets 510, 610 of the stack-up 622 may be mounted to the vehicle structure 110 via extensions 624.

The magnets 510, 610 of the stack-ups 622 interact to balance the storage tank assembly 112 and to resist rotation of the storage tank assembly 112 relative to the vehicle structure 110. For example, each strip magnet 510 on the storage tank assembly 112 may interact with a corresponding strip magnet 510 of a magnetic stack-up 622 of the vehicle structure 110 to define a matched pair 626. The alternating north polarity segments and south polarity segments along each of the strip magnets 510 in the matched pair 626 may align in a specific configuration based on attractive forces and repulsive forces, restricting shear movement of the two strip magnets 510 relative to each other. By maintaining the alignment between the two strip magnets 510 in each of the matched pairs 626, the strip magnets 510 restrain translational and rotational movement of the storage tank assembly 112 relative to the vehicle structure 110. For example, based on the orientation of the strip magnets 510, rotation of the storage tank assembly 112 about the height axis 118 would apply shear forces on the strip magnets 510 on the matched pairs 626, to which the strip magnets 510 would oppose.

Figure 9:
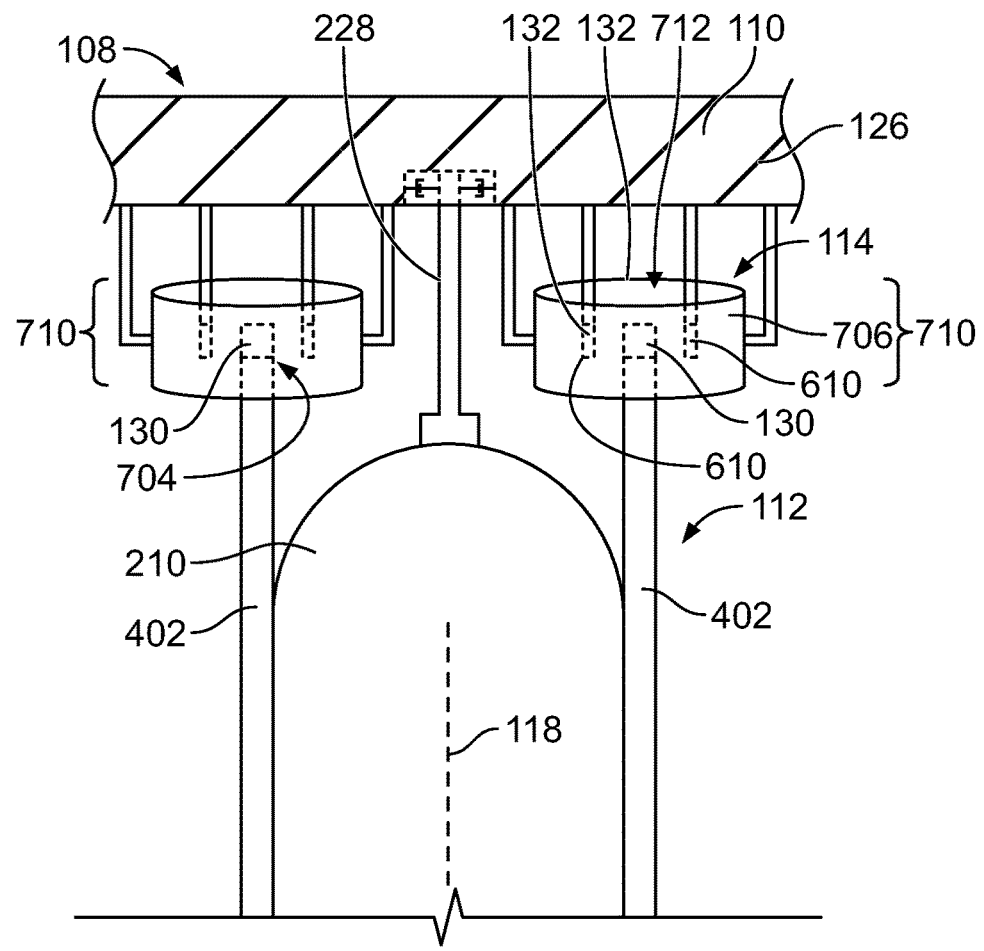
FIG. 9 is a side view of a top portion of the tank support assembly according to another example.

FIG. 9 is a side view of a top portion of the tank support assembly 108 according to another example. In the illustrated example, the storage tank assembly 112 includes at least three tank posts 402 fixedly mounted to the tank 210. Two additional tank posts 402 are required in the illustrated example that are not shown in FIG. 9, which are in front of (e.g., out of the page) and behind (e.g., into the page) the storage tank assembly 112. The magnetic support system 114 includes tank magnets 130 mounted on distal ends 704 of the tank posts 402. The tank magnets 130 are permanent magnets. The magnetic support system 114 also includes several diamagnets 610 and Halbach cylinders 706 that act as the structure magnets 132 shown in previous examples. The Halbach cylinders 706 are cylindrical structures that have an arrangement of permanent magnets. The arrangement of permanent magnets within the cylinder augments the magnetic field such that a near-uniform magnetic field is generated inside the cylinder. In the illustrated example, all the Halbach cylinders 706 utilize a k=2 pattern with the uniform magnetic field oriented towards a center axis of the storage tank assembly 112 (e.g., parallel to or along the height axis 118).

The tank magnets 130 and structure magnets 132 are arranged in several magnetic subsystems 710. Each magnetic subsystem 710 includes two diamagnets 610 extending into an interior region 712 of one Halbach cylinder 706. Each magnetic subsystem 710 also includes at least one tank magnet 130 extending into the interior region 712 of the Halbach cylinder 706 and located between the two diamagnets 610. The tank magnet 130 does not mechanically engage the diamagnets 610 or the Halbach cylinder 706. The Halbach cylinder 706 creates a uniform magnetic field which interacts with the tank magnet 130 to provide an inward repulsive force in a direction perpendicular to the height axis 118 of the storage tank assembly 112. Coupled with the repulsive force generate by the Halbach cylinder within another magnetic subsystem 710 located on the opposite side of the storage tank assembly 112, an unstable equilibrium point is established. The diamagnets 610 located on either side of the tank magnet 130 then provide the stabilization force necessary to establish a stable equilibrium point. Thus the magnetic subsystems 710 shown in FIG. 9 may support and balance lateral movement of the tank 112 relative to the vehicle structure 110.

In the illustrated example, the Halbach cylinders 706 and the diamagnets 610 are suspended from the wall 126 of the vehicle structure 110 towards the storage tank assembly 112, but may be mounted on or recessed within the wall 126 in an alternative example. Two magnetic subsystems 710 are shown in FIG. 9 and two magnetic subsystems 710 are not shown, including one in front of (e.g., out of the page) and one behind (e.g., into the page) the storage tank assembly 112. The magnetic subsystems 710, tank posts 402, and storage tank assembly 112 are mirrored across a symmetry plane. The tank support assembly 108 may include any number of subsystems 710 greater than or equal to six, located at both ends of each corresponding tank post 402.

In the illustrated example, the storage tank assembly 112 includes a mechanical strut 228 that extends from the tank 210 to the wall 126 of the vehicle structure 110. The strut 228 may at least partially vertically support the storage tank assembly 112 in a direction parallel to the height axis 118, and may restrict rotational motion of the tank 112 about the height axis 118. The mechanical strut 228 may optionally be mirrored across a symmetry plane. In an alternative example, the storage tank assembly 112 may include top and bottom tank magnets and associated structure magnets similar to the tank magnets 130A, 130B and the structure magnets 132A, 132B shown in FIG. 2 instead of, or in addition to, the mechanical strut 228.

Figure 10:
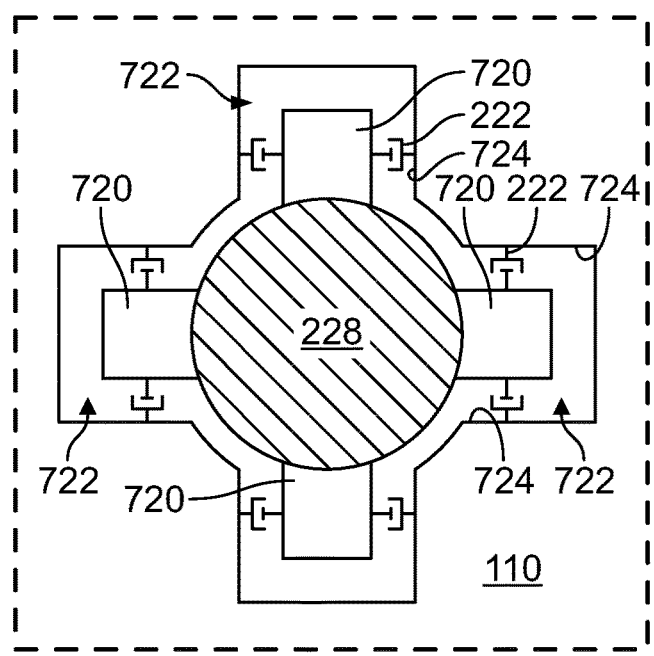
FIG. 10 is a bottom-up view through a cross-section of a mechanical strut shown in FIG. 9 which extends from the storage tank assembly to the vehicle structure.

FIG. 10 is a bottom-up view through a cross-section of the mechanical strut 228 shown in FIG. 9 which extends from the storage tank assembly 112 to the vehicle structure 110. In the illustrated example, the mechanical strut 228 is cylindrical with a circular cross-sectional shape, although the strut 228 may have other cross-sectional shapes in other examples. The strut 228 is connected to four arms 720 that extend radially outward from the strut 228. The four arms 720 are spaced apart from each other around the perimeter of the strut 228 at 90° intervals. The arms 720 extend into corresponding recesses 722 in the vehicle structure 110. Each of the arms 720 is affixed with two dampers 222, such as dashpots or the like, which engage the vehicle structure 110 at side walls 724 of the recesses 722 to dampen motion of the mechanical strut 228 relative to the vehicle structure 110. For example, the dampers 222 on the arms 720 dampen and restrict motion along directions perpendicular to the long axis of the strut 228 (e.g., perpendicular to the height axis 118 shown in FIG. 9).

The combination of all four arms 720 and all eight dampers 222 dampens and restricts the motion of the mechanical strut 228 (and the storage tank assembly 112 attached thereto) in the up-down and left-right directions in the orientation shown in FIG. 10, which corresponds to the front-back and left-right directions relative to the orientation depicted in FIG. 9. The arms 720 and the dampers 222 also restrict rotation of the mechanical strut 228 and the storage tank assembly 112 about the height axis 118.

Each end of the dampers 222 may be affixed to rotating pins or bearings (not shown), which allow the dampers 222 to pivot without damaging the dampers 222 in response to the mechanical strut 228 moving perpendicular to a long axis of the respective damper 222. It is understood that sizes of the components and spaces in FIG. 10 are for descriptive purposes and visual clarity, and may not represent the actual sizes in a physical manifestation of the example. For example, the gaps defined by the vehicle structure 110 surrounding the strut 228 and the arms 720 in FIG. 10 may be greater than in a physical manifestation.

Figure 11:
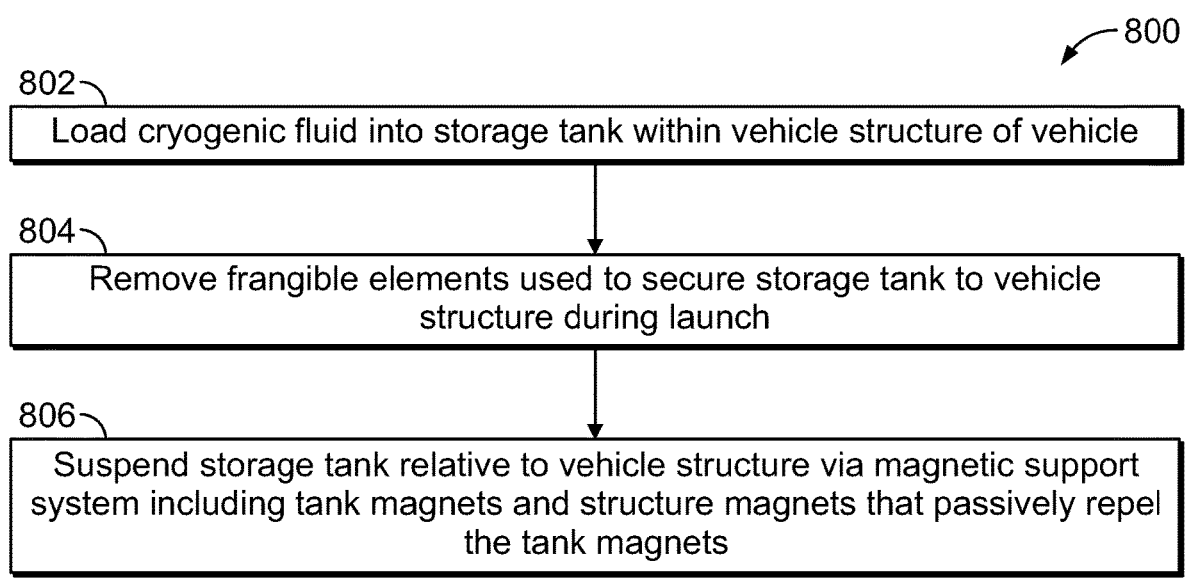
FIG. 11 is a flow chart of a method for supporting a storage tank assembly in a vehicle according to an example.

FIG. 11 is a flow chart of a method 800 for supporting a storage tank assembly in a vehicle, according to an example of the present disclosure. Referring to FIGS. 1-10, the method 800 begins at 802, at which a storage tank assembly 112 attached to vehicle structure 110 of a vehicle 100 is loaded with a cryogenic fluid. The storage tank assembly 112 is attached to the vehicle structure with mechanical struts 228, frangible mechanical elements and/or separable (e.g., detachable) mechanical elements. Step 802 may be conducted in a launch vehicle prior to launch or on a vehicle already in a microgravity environment.

At 804, after the vehicle 100 reaches a microgravity environment, the method 800 includes removing any frangible and/or separable mechanical elements used to secure the storage tank assembly 112 to the vehicle structure 110 during launch, powered propulsion and/or vibration events. Any mechanical struts 228 attaching the storage tank assembly 112 to the vehicle structure 110 that are components of a magnetic support system 114 are left intact.

At 806, the storage tank assembly 112 is suspended relative to the vehicle structure 110 via the magnetic support system 114. The magnetic support system 114 includes tank magnets 130 affixed to the storage tank assembly 112 and structure magnets 132 affixed to the vehicle structure 110. The tank magnets 130 interact with the structure magnets 132 to passively provide repulsive magnetic forces that suspend the storage tank assembly 112 relative to the vehicle structure 110 without the tank magnets 130 mechanically engaging the structure magnets 132. At least some of the tank magnets 130 and/or structure magnets 132 are permanent magnets with ferromagnetic properties.

The storage tank assembly 112 may be stabilized relative to the vehicle structure 110 via diamagnets 610 and/or mechanical struts 228. For example, the stabilization may be provided by diamagnets 610 alone, mechanical struts 228 alone, or both diamagnets 610 and mechanical struts 228. The diamagnets 610 provide restoring forces that stabilize the storage tank assembly 112 in a steady state position within the magnetic field. The diamagnets 610 may be affixed to the storage tank assembly 112 and/or to the vehicle structure 110. The mechanical struts 228 extend across a gap 140 between the storage tank assembly 112 and the vehicle structure 110 to mechanically constrain and tether the storage tank assembly 112 in position relative to the vehicle structure 110 to allow the magnetic support system 114 to support and suspend the storage tank assembly 112 without the storage tank assembly 112 moving out of position.

Compared to known methods for supporting storage tanks in vehicles, the method 800 may include fewer mechanical connections between the storage tank assembly 112 and the vehicle structure 110, and any mechanical connections that are present may have smaller surface areas, more thermally insulating materials, and the like, to reduce thermal conductive pathways from the vehicle structure 110 to the storage tank assembly 112.

As described herein, the tank support assembly 108 is configured to reduce heat transfer from a vehicle structure to a storage tank containing cryogenic fluid to reduce boil-off of the cryogenic fluid and thereby increase the storage life of the cryogenic fluid. The tank support assembly 108 may be installed within vehicles traveling long distances or durations, such as spacecraft traveling in microgravity environments. The tank support assembly 108 may be passive such that the assembly 108 does not require energy stored within the vehicle to support and suspend the storage tank.

While various spatial and directional terms, such as top, bottom, lower, middle, upper, lateral, longitudinal, vertical, front, back, and the like, are used herein to describe examples of the present disclosure, it is understood that such terms are merely used with respect to the orientations shown in the drawings. The orientations may be inverted, rotated, or otherwise changed, such that an upper portion is a lower portion, and vice-versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples of the disclosure without departing from their scope. While the dimensions and types of materials described herein are intended to define the parameters of the various embodiments of the disclosure, the embodiments are by no means limiting and are example embodiments. Many other examples will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A tank support assembly for a vehicle, the tank support assembly comprising:
   a vehicle structure;
   a storage tank assembly;
   tank magnets, affixed to the storage tank assembly;
   structure magnets, affixed to the vehicle structure;
   one or more dampers, affixed to the storage tank assembly; and
   a mechanical element having a first end and a second end, wherein:
      the mechanical element extends from the storage tank assembly to the vehicle structure,
      the first end of the mechanical element is affixed to the storage tank assembly,
      the second end of the mechanical element physically contacts the one or more dampers to mechanically couple the vehicle structure to the storage tank assembly,
      the tank magnets interact with the structure magnets to passively provide repulsive magnetic forces that constrain movement of the storage tank assembly relative to the vehicle structure without the tank magnets contacting the structure magnets,
      the mechanical element tethers the storage tank assembly to the vehicle structure, and
      the one or more dampers enable limited movement of the mechanical element relative to at least one of the storage tank assembly or the vehicle structure.

2. The tank support assembly of claim 1, wherein:
   selected ones of the tank magnets and respective ones of the structure magnets are spring magnets, arranged in pairs,
   the spring magnets in the pairs repel each other when spaced apart a distance that is less than an equilibrium distance and attract each other when spaced apart a distance that is greater than the equilibrium distance,
   a first spring magnet in each of the pairs is one of the tank magnets, and
   a second spring magnet in each of the pairs is one of the structure magnets.

3. The tank support assembly of claim 1, wherein the mechanical element is non-metallic and is a strut or a pin.

4. The tank support assembly of claim 1, wherein selected ones of the structure magnets are diamagnets configured to provide restoring forces for stabilizing the storage tank assembly relative to the vehicle structure.

5. The tank support assembly of claim 1, wherein:
selected ones of the tank magnets and respective ones of the structure magnets are strip magnets, arranged in pairs,
each of the strip magnets has a length and comprises multiple segments with alternating polarity along the length,
a first strip magnet in each of the pairs is one of the tank magnets,
a second strip magnet in each of the pairs is one of the structure magnets, and
the first strip magnet magnetically interacts with the second strip magnet in each of the pairs to restrain translational and rotational movement of the storage tank assembly relative to the vehicle structure by maintaining alignment between the first strip magnet and the second strip magnet.

6. The tank support assembly of claim 1, wherein:
the tank magnets comprise a top magnet, affixed along a top end of the storage tank assembly, and a bottom magnet, affixed along a bottom end of the storage tank assembly that is opposite the top end, and
the top magnet and the bottom magnet are permanent magnets that repel from corresponding ones of the structure magnets, located above the top magnet and below the bottom magnet, respectively, to vertically support and suspend the storage tank assembly.

7. The tank support assembly of claim 6, wherein:
the storage tank assembly comprises a tank, having a toroidal shape and a central cavity, defined by the toroidal shape,
the vehicle structure comprises a column, extending through the central cavity of the tank, and
the mechanical element is a column finger that projects from the column within the central cavity of the tank.

8. The tank support assembly of claim 6, wherein:
the storage tank assembly comprises a tank and one or more tank skirts that engage and surround the tank, and
one or more of the tank magnets are mounted on respective ones of the one or more tank skirts.

9. A method for supporting the storage tank assembly of claim 1, the method comprising:
loading cryogenic fluid into a tank of the storage tank assembly within the vehicle structure of the vehicle; and
suspending the storage tank assembly relative to the vehicle structure via the tank magnets and the structure magnets.

10. The method of claim 9, further comprising stabilizing the storage tank assembly, suspended relative to the vehicle structure via the tank magnets and the structure magnets, in a steady-state position relative to the vehicle structure via diamagnets.

11. The method of claim 9, further comprising removing frangible mechanical elements, used to secure the storage tank assembly to the vehicle structure during launch of the vehicle, when the vehicle is in a microgravity environment.

12. A tank support assembly for a vehicle, the tank support assembly comprising:
a vehicle structure;
a storage tank assembly;
tank magnets, affixed to the storage tank assembly, wherein one of the tank magnets is affixed to the storage tank assembly via a tank post that extends from the storage tank assembly; and
structure magnets, affixed to the vehicle structure, wherein:
the tank magnets interact with the structure magnets to passively provide repulsive magnetic forces that constrain movement of the storage tank assembly relative to the vehicle structure without the tank magnets contacting the structure magnets,
selected ones of the structure magnets are diamagnets, configured to provide restoring forces for stabilizing the storage tank assembly relative to the vehicle structure,
the diamagnets comprise a pair of diamagnets, located within a Halbach cylinder, and
the tank magnet on the tank post extends into the Halbach cylinder between the pair of diamagnets.

13. A tank support assembly for a vehicle, the tank support assembly comprising:
a vehicle structure;
a plurality of structure magnets, affixed to the vehicle structure;
a storage tank assembly, having a top end, a bottom end, and a height axis, extending from the top end to the bottom end; and
tank magnets, affixed to the storage tank assembly, wherein:
one of the tank magnets is a first strip magnet, having a length and comprising multiple segments with alternating polarity along the length, and
one of the structure magnets is a second strip magnet that magnetically interacts with the first strip magnet in a pair of strip magnets so that alignment between the first strip magnet and the second strip magnet of the pair of strip magnets is maintained, restraining translational and rotational movement of the storage tank assembly relative to the vehicle structure, and
another one of the structure magnets is a first diamagnet, located in a space between the pair of strip magnets so that a magnetic stack-up is defined by the first diamagnet and the pair of strip magnets.

14. The tank support assembly of claim 13, wherein:
at least a first magnet of the tank magnets is mounted on a front area of the storage tank assembly,
at least a second magnet of the tank magnets is mounted on a back area of the storage tank assembly, opposite the front area,
at least a third magnet of the tank magnets is mounted on a left area of the storage tank assembly, and
at least a fourth magnet of the tank magnets is mounted on a right area of the storage tank assembly, opposite the left area, and
the front area, the back area, the left area, and the right area are located between the top end and the bottom end of the storage tank assembly.

15. The tank support assembly of claim 13, wherein:
the storage tank assembly comprises a tank, having a toroidal shape and a central cavity, defined by the toroidal shape, and
the vehicle structure comprises a column, extending through the central cavity of the tank.

16. The tank support assembly of claim 13, wherein:
selected ones of the structure magnets are diamagnets, separate from the first diamagnet in the magnetic stack-up, that interact with respective ones of the tank magnets, affixed to a middle region of the storage tank assembly, the middle region of the storage tank assembly is located between the top end and the bottom end of the storage tank assembly, and the diamagnets that interact with the respective ones of the tank magnets, affixed to the middle region of the storage tank assembly, constrain one or more of lateral, longitudinal, and rotational movement of the storage tank assembly relative to the vehicle structure.

17. The tank support assembly of claim 13, wherein selected ones of the structure magnets are diamagnets, separate from the first diamagnet in the magnetic stack-up, that interact with respective ones of the tank magnets, stabilizing the storage tank assembly.

18. The tank support assembly of claim 13, further comprising a mechanical strut, extending from the storage tank assembly to the vehicle structure, wherein:
the mechanical strut is non-metallic and is coupled to the storage tank assembly along a middle region of the storage tank assembly, the middle region is located between the top end and the bottom end of the storage tank assembly, and the mechanical strut is configured to constrain one or more of lateral, longitudinal, or rotational movements of the storage tank assembly relative to the vehicle structure.

19. The tank support assembly of claim 13, wherein:

the tank magnets comprise a top magnet, affixed along the top end of the storage tank assembly, and a bottom magnet, affixed along the bottom end of the storage tank assembly, and the top magnet and the bottom magnet interact with corresponding ones of the structure magnets, located above the top magnet and below the bottom magnet, respectively, to passively provide repulsive magnetic forces that support and suspend the storage tank assembly along the height axis relative to the vehicle structure without the tank magnets mechanically engaging the structure magnets.

20. The tank support assembly of claim 19, wherein:

the top magnet and the bottom magnet of the tank magnets are spring magnets that form pairs of spring magnets with corresponding ones of spring magnets of the structure magnets, and the spring magnets in each of the pairs of spring magnets are configured to repel each other when spaced apart a distance that is less than an equilibrium distance and attract each other when spaced apart a distance that is greater than the equilibrium distance.

* * * * *